(12) United States Patent
Kondou (10) Patent No.: US 6,418,355 B1
(45) Date of Patent: Jul. 9, 2002

(54) LOT SUPPLY SYSTEM AND LOT SUPPLY METHOD

(75) Inventor: Hiroshi Kondou, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/573,739

(22) Filed: May 18, 2000

(30) Foreign Application Priority Data

May 20, 1999 (JP) .......................................... 11-140478

(51) Int. Cl.[7] ............................. G06F 7/00; G06F 19/00
(52) U.S. Cl. ....................... 700/213; 700/213; 700/214; 700/228; 700/101
(58) Field of Search ................................ 700/213, 214, 700/216, 225, 226, 228, 101

(56) References Cited

U.S. PATENT DOCUMENTS

| 5,375,061 A | * | 12/1994 | Hara et al. ................... 700/101 |
| 5,402,350 A | * | 3/1995 | Kline ...................... 700/101 X |
| 5,971,592 A | * | 10/1999 | Kralj et al. .............. 700/225 X |
| 6,061,607 A | * | 5/2000 | Bradley et al. .......... 700/216 X |
| 6,122,566 A | * | 9/2000 | Nguyen et al. ......... 700/218 X |
| 6,141,602 A | * | 10/2000 | Igarashi et al. ......... 700/226 X |
| 6,169,935 B1 | * | 1/2001 | Iwasaki et al. .......... 700/214 X |

FOREIGN PATENT DOCUMENTS

| GB | 2126374 | 3/1984 | ........... G05B/15/02 |
| JP | 10-116875 | 5/1998 | |
| JP | 11-354397 | 12/1999 | ........... H01L/21/02 |
| WO | WO 98/54632 | 12/1998 | |

* cited by examiner

Primary Examiner—Christopher P. Ellis
Assistant Examiner—Gene O Crawford
(74) Attorney, Agent, or Firm—Hayes Soloway P.C.

(57) ABSTRACT

A lot supply system includes a plurality of processing units, a supply unit, a plurality of counters, and a supply controller. The processing units output a lot supply request and perform a predetermined process for a lot supplied to them. The supply unit supplies a lot stored in it to requesting processing units in response to the lot supply request from the processing units. The counters count product lots supplied to the requesting processing units at least in units of the requesting processing units. When counts of the counters reach preset values set in units of the requesting processing units, the supply controller supplies measurement lots stored in advance to the requesting processing unit and initializes counts of the counters. A lot supply method is also disclosed.

12 Claims, 5 Drawing Sheets

LOT SUPPLY SYSTEM AND LOT SUPPLY METHOD

SUMMARY OF THE INVENTION

The present invention relates to a lot supply system and lot supply method and, more particularly, to a lot supply system and lot supply method suitably applied to a production line where material processing in a clean atmosphere is required as in the pre-process of semiconductor device manufacture.

Conventionally, various types of lot supply systems have been developed in which a product lot is supplied to a unit in a processing step, the lot is recovered after it is processed by the unit in the processing step, and the recovered lot is supplied to a unit in a measurement step.

As a prior art of lot supply described above, for example, a technique described in "Semiconductor Production System", Japanese Patent Laid-Open No. 10-116875 (reference 1) is proposed. The semiconductor production system of reference 1 aims at shortening a period of time for production of semiconductor wafers, and comprises a plurality of processing units for processing semiconductor wafers in a lot, a stocker for storing a lot except the lot in process in the processing units, and a plurality of non-processing units provided in association with the stocker to perform either one of inspection, measurement, and foreign matter removal, other than processing of the semiconductor wafers in the lot. According to this system, non-processing of the semiconductor wafers in the lot is performed by the non-processing units while the lot is stored in the stocker.

The prior art described above has the following problems.

In the conventional lot supply system, as described above, the product lot is supplied to the unit in the processing step, the lot is recovered after it is processed by this unit, and the recovered lot is supplied to the unit in the measurement step. Since the measurement step is not generally automated, it requires manual operation. Hence, in the measurement step, every time measurement operation is performed, the operator need access the product lot. In particular, in the manufacturing process of semiconductor wafers and the like, dust from the operator influences the product lot to interfere with an increase in product yield.

SUMMARY OF THE INVENTION

It is an object of the present invention to provide a lot supply system and lot supply method in which the product lot is protected from dust from an operator so that the product yield is increased.

In order to achieve the above object, according to the present invention, there is provided a lot supply system comprising a plurality of processing units for outputting a lot supply request and performing a predetermined process for a lot supplied thereto, a lot supply unit for supplying a lot stored therein to requesting processing units in response to the lot supply request from the processing units, a plurality of counting means for counting product lots supplied to the requesting processing units at least in units of the requesting processing units, and supply control means for, when counts of the counting means reach preset values set in units of the requesting processing units, supplying measurement lots stored in advance to the requesting processing units and initializing counts of the counting means.

DESCRIPTION OF THE PREFERRED EMBODIMENTS

The present invention will be described in detail with reference to the accompanying drawings.

[First Embodiment]

Figure 1:
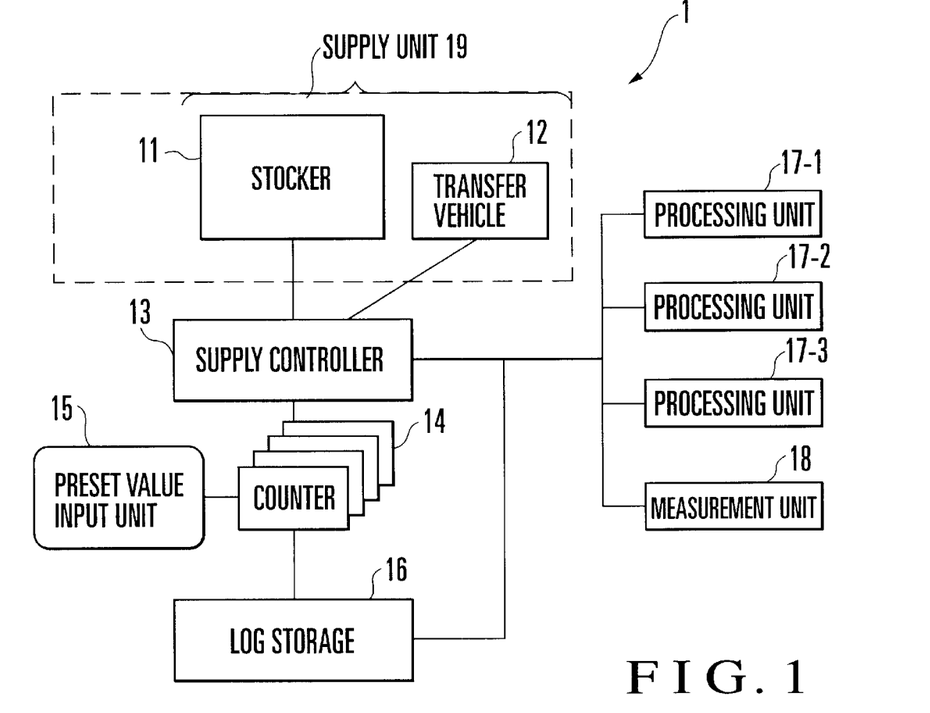
FIG. 1 is a block diagram showing the schematic arrangement of a lot supply system according to the first embodiment of the present invention.

FIG. 1 shows the schematic arrangement of a lot supply system according to the first embodiment of the present invention. Referring to FIG. 1, a lot supply system 1 of this embodiment has a stocker 11 for storing lots, a transfer vehicle 12 for transferring the lots, a supply controller 13 for controlling lot supply performed by the stocker 11 and transfer vehicle 12, a plurality of counters 14 for counting the number of lots supplied in units of requesting units, a preset value input unit 15 for inputting preset values to the counters 14, and a log storage 16 for storing the log of lot supply. The stocker 11 and transfer vehicle 12 constitute a supply unit 19. A plurality of processing units 17-1 to 17-3 are connected to the lot supply system 1 to perform various types of processes for the lots. A measurement unit 18 is connected to the lot supply system 1 to measure a lot (reference lot).

In the case of semiconductor integrated circuits, a predetermined number of wafers are treated as one lot. When a plurality of transistors are produced from one wafer, the plurality of transistors produced from one wafer are treated as one lot, and the number of transistors constituting one lot is not limited to a specific value. The arrangement shown in FIG. 1 is merely an example, and the number of processing units connected to the supply unit 19 is not limited to that shown in FIG. 1.

The stocker 11 has a function of storing in it a lot which is placed on a load port (not shown) attached to the stocker 11 by the transfer vehicle 12. The stocker 11 has a function of reporting the ID of the lot to the supply controller 13 when the storing operation is started. The stocker 11 also has a function of taking out the lot and moving it to the load port where the transfer vehicle 12 can receive the lot in response to an instruction from the supply controller 13. The stocker further has a function of reporting that transfer of the lot to the load port is completed to the supply controller 13.

The transfer vehicle 12 partly constituting the supply unit 19 has a function of transferring the lots from the load port of the stocker 11 to the processing units 17-1 to 17-3 or measurement unit 18, from the processing units 17-1 to 17-3 to the load port of the stocker 11 or the measurement unit 18, and from the measurement unit 18 to the load port of the stocker 11 or the processing units 17-1 to 17-3, in response to an instruction from the supply controller 13.

The supply controller 13 is connected to the supply unit 19, processing units 17-1 to 17-3, and measurement unit 18 through communication lines. The supply controller 13 has a function of checking the current positions of the respective lots, and advancing by one the step for a lot which is ended upon reception of a communication message informing that the process by the processing units 17-1 to 17-3 is ended or that measurement by the measurement unit 18 is ended. The supply controller 13 also has a function of comparing the step for the lot with the IDs of the processing units 17-1 to 17-3 and measurement unit 18 upon reception of lot supply requests from the processing units 17-1 to 17-3 and measurement unit 18, to check whether the next step for the lot is a step that can be processed by the processing units 17-1 to 17-3 or measured by the measurement unit 18. The supply controller 13 further has functions of, when there are a plurality of lots that can be processed or measured, instructing the supply unit 19 to select one from these lots, and instructing to transfer it to the supply requesting processing units 17-1 to 17-3 or measurement unit 18.

The supply controller 13 has a function of, when instructing transfer of the selected lot, instructing count-up to a counter 14 specified by the ID of a supply target unit and a processing condition ID of the selected lot, and informing the counter of the ID of the lot which is instructed to be supplied. The supply controller 13 has a function of storing the article name of a reference lot (measurement lot), the unit ID, and the processing condition ID instructed by the counter 14 as a reference lot supply request. The supply controller 13 also has a function of instructing the supply unit 19 to supply lots corresponding to the product names of the reference lots designated by the reference lot supply request to the requesting processing units 17-1 to 17-3 upon reception of a lot supply request from a processing unit having a unit ID for which a reference lot supply request is made. The supply controller 13 further has a function of deleting a corresponding reference lot supply request, clearing the "preset count" of the counter designated by the reference lot supply request to zero, and informing the ID of this reference lot when supply instruction is made.

The reference lot is a lot which has undergone the same processing steps as those for a target lot which is to be processed in, e.g., the manufacturing line or packaging line, so that it can be compared with the process target lot. The number of reference lots can be one or more. The reference lots are fabricated under the same conditions and have the same characteristics, quality, and the like. The measurement values of the reference lots are used in place of the measurement values of the product lots, as will be described later with reference to FIG. 6. A processed reference lot, e.g., a reference lot formed to have the thickness of a semiconductor film, an insulating film, or the like, may be etched and cleaned so that it can be used as a reference lot again.

Figure 3:
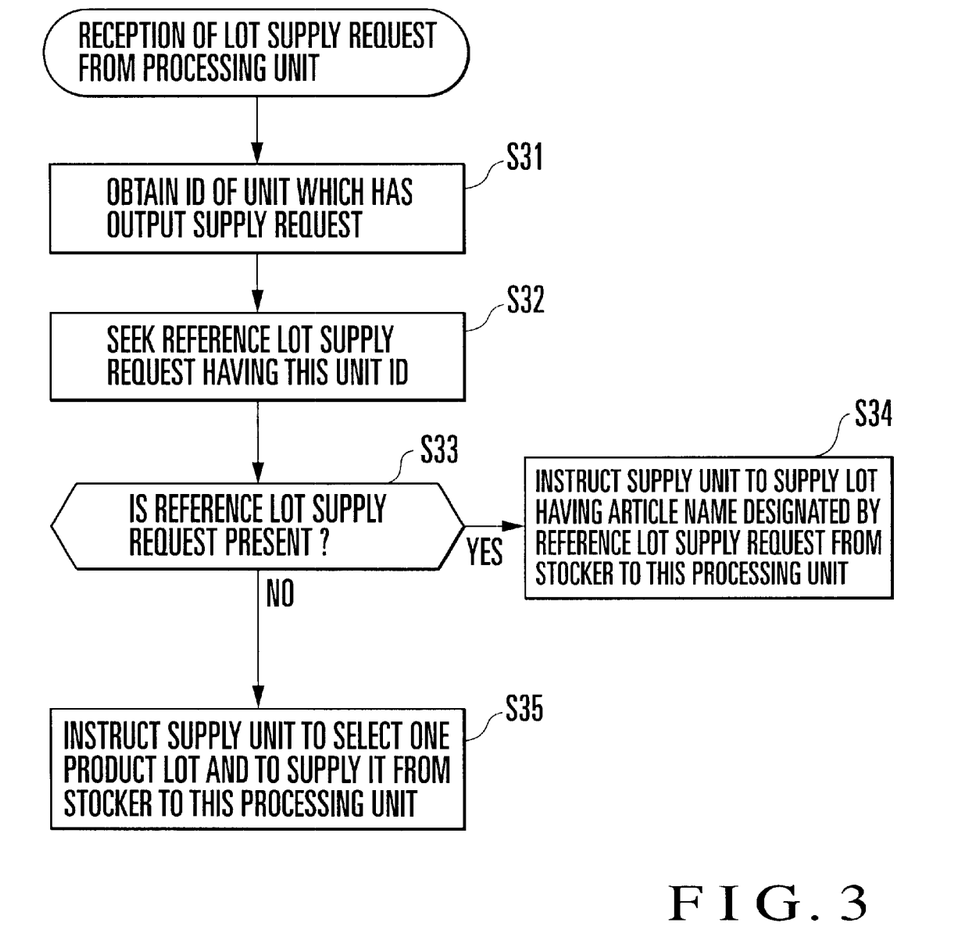
FIG. 3 is a flow chart showing the operation of the lot supply system shown in FIG. 1 upon reception of a lot supply request.

Upon reception of a lot supply request from the processing units 17-1 to 17-3, the supply controller 13 performs the process shown in the flow chart of FIG. 3 (to be described later).

The processing units 17-1 to 17-3 are connected to the lot supply system 1 as described above, and perform a predetermined process for the product lots supplied from the lot supply system on the basis of the lot supply request sent from them. The measurement unit 18 is connected to the lot supply system as described above, and performs predetermined measurement for the reference lot supplied from the lot supply system.

Figure 2:
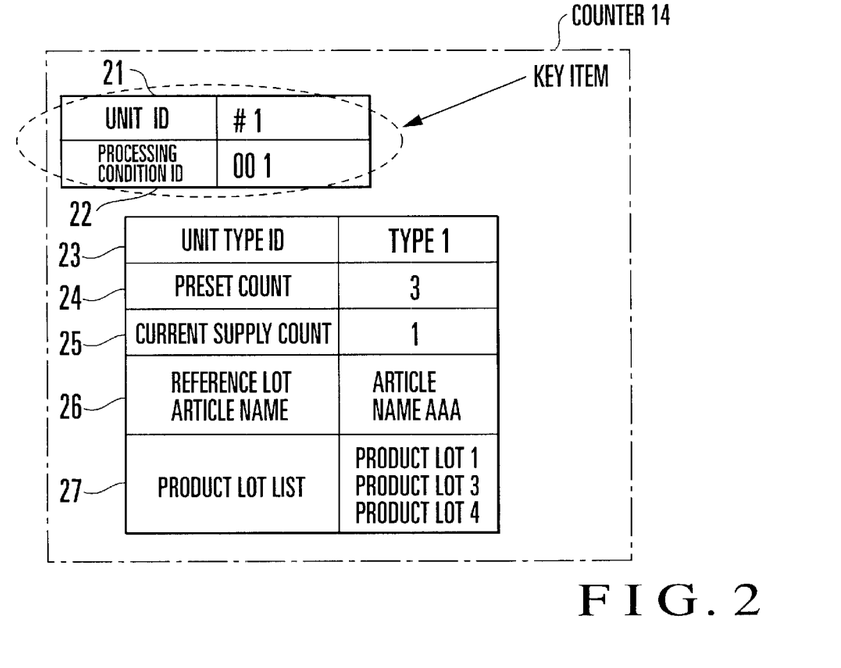
FIG. 2 is a table showing the internal structure of a counter shown in FIG. 1.

FIG. 2 shows the internal structure of each counter 14 shown in FIG. 1. As shown in FIG. 2, the counter 14 has the following items:

"unit ID" 21
"processing condition ID" 22
"unit type ID" 23
"preset count" 24
"current supply count" 25
"reference lot article name" 26
"product lot list" 27

The counters 14 exist in units of combinations of the "unit ID" 21 and "processing condition ID" 22. Accordingly, when the combination of the "unit ID" 21 and "processing condition ID" 22 is determined, one specific counter 14 is uniquely determined. In the item of the "unit type ID" 23, an ID indicating the type of the "unit ID" 21 is set. The counter 14 has a function of receiving a count-up request from the supply unit 19 and incrementing the "current supply count" 25. The counter 14 also has a function of informing the supply controller 13 of the "unit ID" 21 of its own, "processing condition ID" 22, and "reference lot article name" 26 when the "current supply count" 25 and "preset count" 24 become equal.

As the "product lot list" 27, a plurality of product lot IDs are recorded. The counter 14 has a function of adding a product lot ID informed by the supply controller 13 to the "product lot list" 27. The counter 14 has a function of, when informed of the reference lot ID by the supply controller 13, informing the log storage 16 of the informed reference lot ID and all the product lot IDs recorded in the "product lot list" 27 at once, and clearing the "product lot list" 27.

The preset value input unit 15 has a function of designating a specific "unit ID" 21 and "processing condition ID" 22 to select a corresponding counter 14, and inputting the "preset count" 24 of the selected counter 14 and the "reference lot article name" 26 through an operator. The preset value input unit 15 also has a function of designating a specific "unit type ID" 23 and "processing condition ID" 22 to select all the counters 14 designated by all "unit IDs" 21 belonging to this unit type and the "processing condition ID" 22, and inputting the "preset counts" 24 of the selected counter group and the "reference lot article name" 26 through an operator.

The log storage 16 has a function of storing the combination of the reference lot ID and a plurality of product lot IDs informed by the counter 14. The log storage 16 also has a function of receiving process start report and process end report from the processing units 17-1 to 17-3 and storing a process log comprised of the reporting processing unit ID, the ID of the processed lot, the process start time, and the process end time. The log storage 16 further has a function of receiving the measurement result data of the reference lot and the lot ID from the measurement unit 18, obtaining the ID (generally a plurality of IDs) of the corresponding product lot by using the received combination of the lot IDs, and copying the measurement result data to register it in the log of the processing units of the corresponding product lot group.

The operation of the supply controller 13 in the lot supply system 1 described above, upon reception of a lot supply request, will be described with reference to the flow chart shown in FIG. 3.

The supply controller 13 obtains the "unit ID" 21 of a processing unit which has output a lot supply request (step S31), and seeks a reference lot supply request having the obtained "unit ID" 21 (step S32). When it is determined that a reference supply request is present, the supply controller 13 instructs the supply unit 19 to supply a lot having an article number designated by the reference lot supply request to the requesting processing unit (step S34). In step S33, if it is determined that the reference lot supply request is not present, the supply controller 13 instructs the supply unit 19 to select one product lot, and to supply it from the stocker 11 to the requesting processing unit (step S35).

The lot supply control operation of the lot supply system described above will be described with reference to FIGS. 4 to 6.

Prior t o operating the system, the "preset count" 24 of the counter 14 and the "reference lot article name" 26 corresponding to the specific "unit ID" 21 and "processing condition ID" 22 a reset in advance. Assume that the "current number of times of process" of the counter 14 is "0", the "product lot list" 27 is empty, and the supply controller 13 has no reference lot supply request. The system is operated in this state. For the sake of descriptive convenience, assume that the "unit ID" 21 is "#1" and that the "processing condition ID" 22 is "001".

Figure 4:
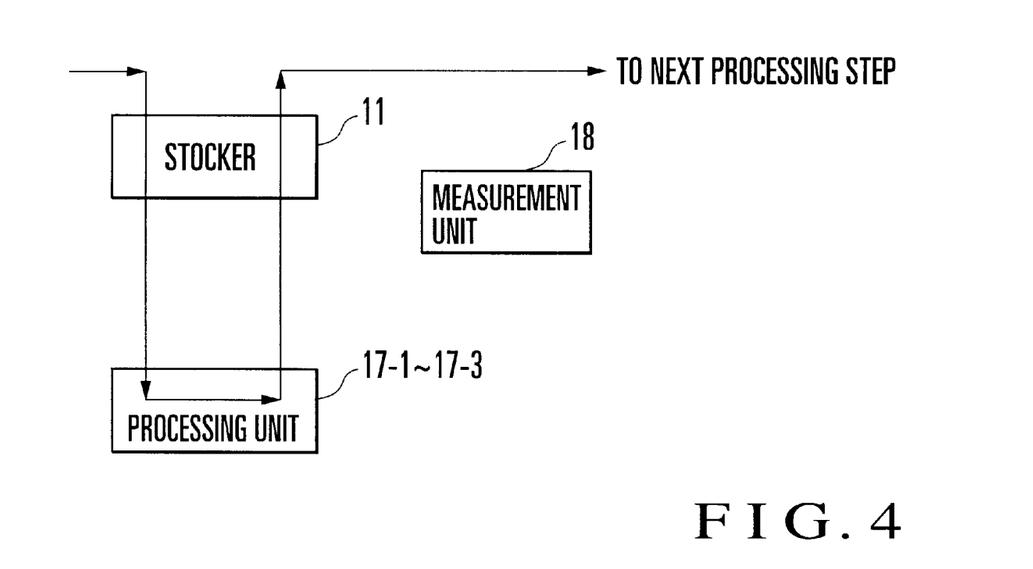
FIG. 4 is a view showing the flow of a product lot in the lot supply system shown in FIG. 1.
Figure 5:
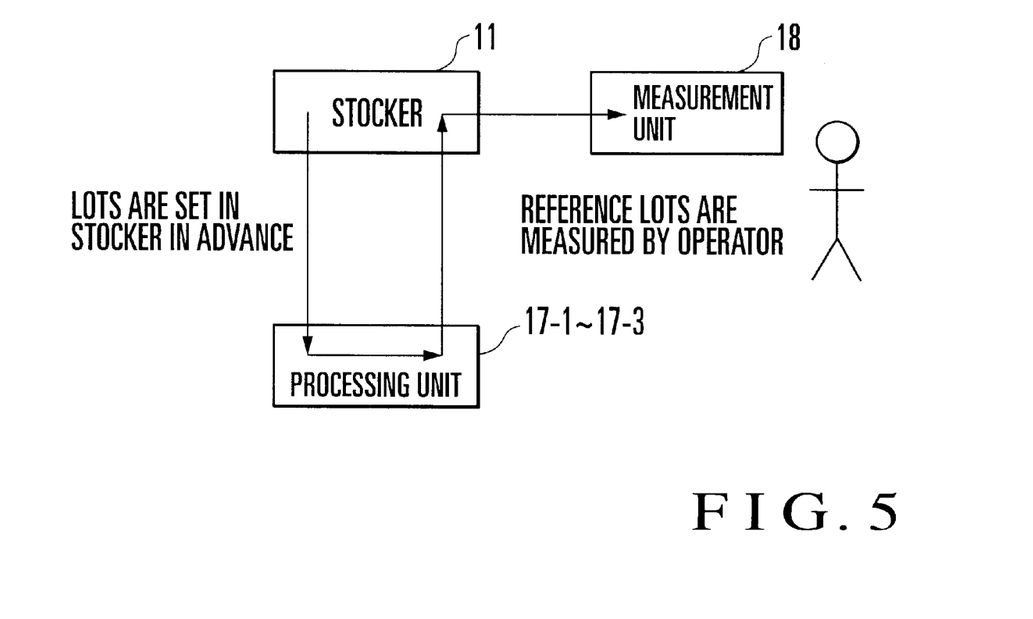
FIG. 5 is a view showing the flow of a reference lot in the lot supply system shown in FIG. 1.

Note th at the step flow of the product lot is only a process step and does not include a measurement step, as shown in FIG. 4, and that the step flow of the reference lot includes both the process step and measurement step, as shown in FIG. 5.

When the processing units 17-1 to 17-3 ("#1") are set in a state capable of accepting lots, they request the lots from the supply controller 13. The supply controller 13 checks whether the requesting processing units 17-1 to 17-3 have reference lot supply requests, as described with reference to FIG. 3. If no, the supply controller 13 selects appropriate product lots from the stocker 11 and instructs the supply unit 19 to supply them to the requesting processing units 17-1 to 17-3. In this case, assume that the "processing condition ID" 22 of the selected lots is "001". The supply controller 13 increments the "current supply counts" 25 of the counters 14 designated by the requesting "unit IDs" 21 (="#1") and the "processing condition IDs" 22 (="001") from "0" to "1". Furthermore, the supply controller 13 registers the IDs of the selected lots in the "product lot lists" 27 of the corresponding counters 14.

In this manner, the "current supply count" 25 of the counter 14 is incremented only when a lot having a "processing condition ID"="001" is supplied to the requesting processing unit. Every time a lot having "001" as the "processing condition ID" 22 is supplied to the requesting processing unit ("#1") , the "current supply count" 25 of the corresponding counter 14 is incremented by one to finally become equal to the value of the "preset count" 24. In this case, the counter 14 informs the supply controller 13 of the "unit ID" 21 (="#1") of its own, "processing condition ID" 22 (="001"), and "reference lot article name" 26. The supply controller 13 receives this information and forms a reference lot supply request in it.

Upon reception of a lot supply request, as described with reference to FIG. 3, when the supply controller 13 finds a reference lot supply request, it instructs the supply unit 19 to seek a lot belonging to the "reference lot article name" 26 designated by the reference lot supply request from the stocker 11 and to supply it. In this case, this reference lot supply request is deleted, and the "current supply count" 25 of the corresponding counter 14 is cleared to zero. The supply controller 13 also informs the corresponding counter 14 of the ID of the lot which is instructed to be supplied. The counter 14 informs the log storage 16 of the IDs of the plurality of product lots which have been registered in the "product lot list" 27 until this time point, and the reference lot ID informed by the supply controller 13, and clears all the IDs of the product lots from the "product lot list" 27.

The processing units 17-1 to 17-3 then process the supplied reference lots. After the process is ended, the reference lots are supplied to the measurement unit 18 by the supply controller 13 and supply unit 19. The operator operates the measurement unit 18 to measure the reference lots. When measurement is completed, the measurement unit 18 informs the log storage 16 of the measurement data and reference lot ID.

Figure 6:
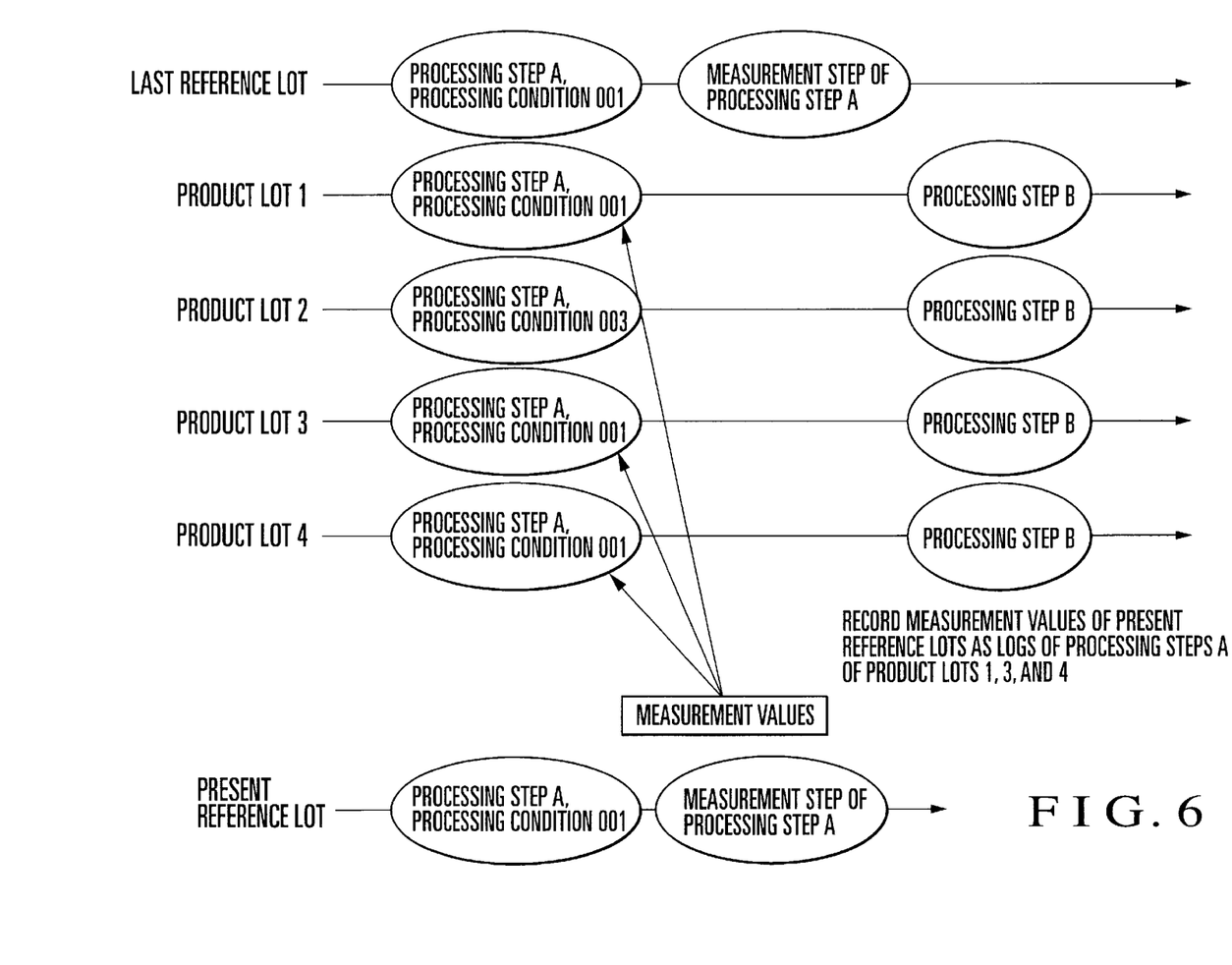
FIG. 6 is an illustration showing distribution of measurement values in the lot supply system shown in FIG. 1.

From the informed reference lot IDs, the log storage 16 obtains a plurality of product lot IDs on the basis of the correspondence between the reference lot ID and the plurality of product lot IDs informed in advance. The measurement data is recorded as the logs of the process steps of these lots. As a result, the measurement results of the reference lots are distributed to the product lots which are processed by the requesting processing units 17-1 to 17-3 with the processing conditions "001", after the process of the previous reference lot until the process of the present reference lot, as shown in FIG. 6.

According to the first embodiment, in place of the product lots, the reference lots are subjected to the measurement steps and the measurement results are distributed to the logs of the product lots by the lot supply system. Even if the measurement step needs an operator, the operator and the product lots can be separated, so that the product yield can be improved.

[Second Embodiment]

Figure 7:
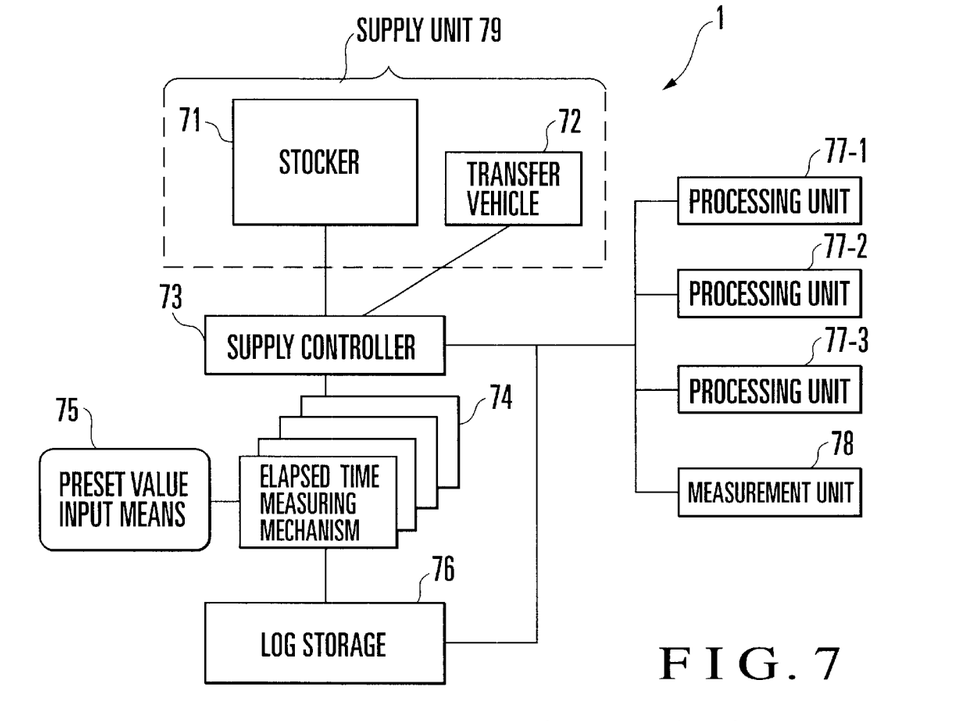
FIG. 7 is a block diagram showing the schematic arrangement of a lot supply system according to the second embodiment of the present invention.

FIG. 7 shows the schematic arrangement of a lot supply system according to the second embodiment of the present invention. Referring to FIG. 7, a lot supply system 1 of this embodiment has a stocker 71, transfer vehicle 72, supply controller 73, a plurality of elapsed time measuring mechanisms 74, preset value input means 75, and log storage 76. Processing units 77-1 to 77-3 are connected to the lot supply system 1. A measurement unit 78 is connected to the lot supply system 1. The arrangement shown in FIG. 7 is merely an example, and the number of processing units connected to the lot supply system 1 is not limited to that shown in FIG. 7.

The second embodiment is different from the first embodiment in that the plurality of elapsed time measuring mechanisms 74 are provided to the lot supply system 1 in place of the plurality of counters 14 shown in FIG. 1.

Figure 8:
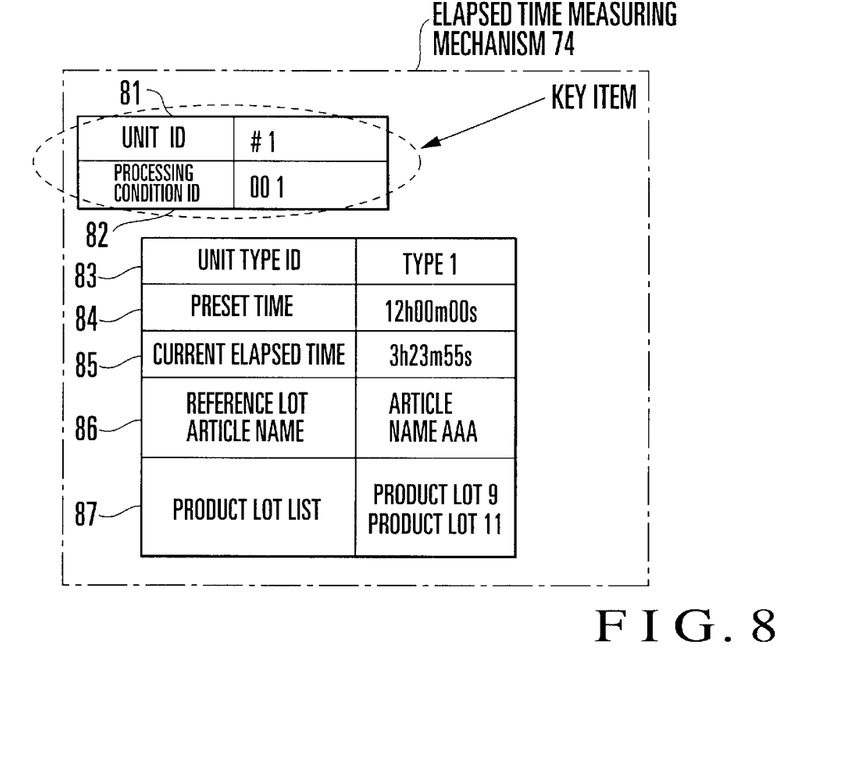
FIG. 8 is a table showing the internal structure of the elapsed time measuring mechanism shown in FIG. 7.

FIG. 8 shows the internal structure of each elapsed time measuring mechanism 74 shown in FIG. 7. As shown in FIG. 7, the elapsed time measuring mechanism 74 has the following items:

"unit ID" 81

"processing condition ID" 82

"unit type ID" 83

"preset count" 84

"current elapsed time" 85

"reference lot article name" 86

"product lot list" 87

The elapsed time measuring mechanisms 74 exist in units of combinations of the "unit ID" 81 and "processing condition ID" 82. Accordingly, when the "unit ID" 81 and "processing condition ID" 82 are determined, one specific elapsed time measuring mechanism 74 is uniquely determined. The elapsed time measuring mechanism 74 has a timer. The mechanism 74 has a function of displaying an elapsed time elapsed since the timer is reset to the "current elapsed time" 85. The mechanism 74 also has a function of constantly monitoring the "current elapsed time" 85 and "preset time" 84, and when the "current elapsed time" 85 and "preset time" 84 become equal to each other, informing the supply controller 73 of the "unit ID" 81 of its own, "processing condition ID" 82, and "reference lot article name" 86.

The elapsed time measuring mechanism 74 has a function of adding a product lot ID informed by the supply controller 73 to the "product lot list" 87. The elapsed time measuring mechanism 74 also has a function of, when informed of the reference lot ID by the supply controller 73, informing the log storage 76 of the informed reference lot ID and all the product lot IDs recorded in the "product lot list" 87 at once, and clearing the "product lot list" 87.

In this embodiment, since the reference lots are supplied to the processing units 77-1 to 77-3 at a predetermined time interval, the processing results of the processing units 77-1 to 77-3 can be actually measured by the measurement unit 78 at a predetermined time interval. Hence, this system is suitable for monitoring a measurement value which changes mainly over time.

The operation of the lot supply system 1 described above will be described in detail.

The elapsed time measuring mechanisms 74 measure a time elapsed since the time at which the last measurement lot is supplied, in units of combinations of the processing units 77-1 to 77-3 and the lot processing conditions or in units of the processing units 77-1 to 77-3. The supply controller 73 supplies the reference lots to the processing units 77-1 to 77-3 at the predetermined time interval measured by the elapsed time measuring mechanisms 74. Therefore, the processing results of the processing units 77-1 to 77-3 can be actually measured by the measurement unit 78 at the predetermined time interval.

According to this embodiment, since the reference lots are supplied to the processing units 77-1 to 77-3 at the predetermined time interval, the processing results of the processing units 77-1 to 77-3 can be actually measured by the measurement unit 78 at the predetermined time interval. This is suitable when monitoring a measurement value which changes mainly over time.

Regarding the reference lot of this embodiment, for example, in the case of a process of forming an insulating film on a semiconductor wafer, an insulating film is formed with the same conditions as those for other product lots. After the reference lot is formed, it is measured by the measurement unit 78, and the measurement result is stored. After that, the insulating film is removed from the reference lot by etching, CMP (Chemical Mechanical Polishing), or the like. The reference lot is then cleaned, is subjected to a manufacturing process with the same conditions as those for other product lots again, and is treated as the reference lot.

As has been described above, according to the present invention, in place of the product lots, the reference lots are subjected to the measurement step, and the measurement results are distributed to the logs of the product lots by the lot supply system. More specifically, measurement of the product lots is substituted by measurement of the measurement lots, and the measurement results of the measurement lots are reflected in the processing logs of the product lots. Even if the measurement step needs an operator, the operator and the product lots can be separated reliably. As a result, the product lots can be protected by dust from the operator, so that the product yield can be improved.

What is claimed is:

1. A lot supply system comprising:
a plurality of processing units, each said processing unit capable of outputting a lot supply request and performing a predetermined process for a lot supplied thereto;
a lot supply unit for supplying a lot stored therein to said requesting processing units in response to the lot supply request from said processing units;
a plurality of counting means for counting product lots supplied to said requesting processing units at least in units of said requesting processing units; and
supply control means for, when counts of said counting means reach preset values set in units of said requesting processing units, supplying measurement lots stored in advance to said requesting processing units and initializing counts of said counting means.

2. A system according to claim 1, wherein
said plurality of counting means count the product lots supplied to said requesting processing units in units of types of said requesting processing units, and
said supply control means supplies said measurement lots stored in advance to said requesting processing units when the counts of said counting means reach the preset values set in units of the types of said requesting processing units.

3. A system according to claim 1, wherein
said plurality of counting means count the product lots supplied to said requesting processing units in units of combinations of said requesting processing units and lot processing conditions, and
said supply control means supplies said measurement lots stored in advance to said requesting processing units when the counts of said counting means reach the preset values set in units of combinations of the lot processing conditions and either one of said requesting processing units and the types of said requesting processing units.

4. A system according to claim 1, further comprising log storage means for receiving measurement data of said measurement lots from said requesting processing units, and storing the received measurement data as logs of product lots processed by said requesting processing units since last supply of said measurement lots until present supply of said measurement lots.

5. A system according to claim 1, wherein said counting means inform said supply control means of IDs of said requesting processing units, an ID of lot processing conditions, and article names of said measurement lots when a present number of times of lot supply and a preset number of times become equal to each other.

6. A lot supply system comprising:
a plurality of processing units, each said processing unit capable of outputting a lot supply request and performing a predetermined process for a lot supplied thereto;
a lot supply unit for supplying a lot stored therein to said requesting processing units in response to the lot supply request from said processing units;
elapsed time measuring means for measuring an elapsed time elapsed since time at which a last measurement lot is supplied at least in units of said requesting processing units; and
supply control means for, when a measurement value of said elapsed time measuring means exceeds preset values set in units of said requesting processing units, supplying measurement lots stored in advance to said requesting processing units and initializing values of said elapsed time measuring means.

7. A system according to claim 6, wherein
said elapsed time measuring means measures the elapsed time elapsed since the time at which said last measurement lot is supplied in units of types of said requesting processing units, and
said supply control means supplies said measurement lots stored in advance to said requesting processing units when the measurement value of said elapsed time measuring means exceeds the preset values set in units of the types of said requesting processing units.

8. A system according to claim 6, wherein said elapsed time measuring means measures the elapsed time elapsed since said last measurement lot is supplied in units of combinations of lot processing conditions and one of said requesting processing units and types of said requesting lot processing units, and said supply control means supplies said measurement lots stored in advance to said requesting processing units when the measurement value of said elapsed time measuring means exceeds the preset values set in units of said requesting processing units, in units of combinations of the lot processing conditions and one of said requesting processing units and the types of said requesting processing units.

9. A system according to claim 6, further comprising log storage means for receiving measurement data of said measurement lots from said requesting processing units, and storing the received measurement data as logs of product lots processed by said requesting processing units since last supply of said measurement lots until present supply of said measurement lots.

10. A system according to claim 6, wherein said elapsed time measuring means informs said supply control means of IDs of said requesting processing units, an ID of lot processing conditions, and article names of said measurement lots when a present elapsed time and the preset time become equal to each other.

11. A lot supply method comprising the steps of:

outputting to a supply unit a lot supply request from one of a plurality of processing units which performs a predetermined process for a lot supplied thereto;

supplying a lot stored in said supply unit to a requesting processing unit in response to the lot supply request;

counting product lots supplied to said requesting processing unit at least in units of said requesting processing unit;

supplying measurement lots stored in said supply unit in advance to said requesting processing unit when counts of the supplied product lots reach preset values set in units of said requesting processing unit; and initializing the counts in units of said requesting processing unit.

12. A method according to claim 11, further comprising the steps of:

receiving measurement data of said measurement lots from said requesting processing units; and storing the received measurement data as logs of product lots processed by said requesting processing units since last supply of said measurement lots until present supply of said measurement lots.

* * * * *